June 23, 1964  M. LOOMIS  3,137,876
DOCK LEVELER CONSTRUCTION
Filed March 3, 1961  2 Sheets-Sheet 1

INVENTOR.
Martin Loomis.
BY
Fearman Fearman & McCulloch
ATTORNEYS

June 23, 1964 M. LOOMIS 3,137,876
DOCK LEVELER CONSTRUCTION
Filed March 3, 1961 2 Sheets-Sheet 2
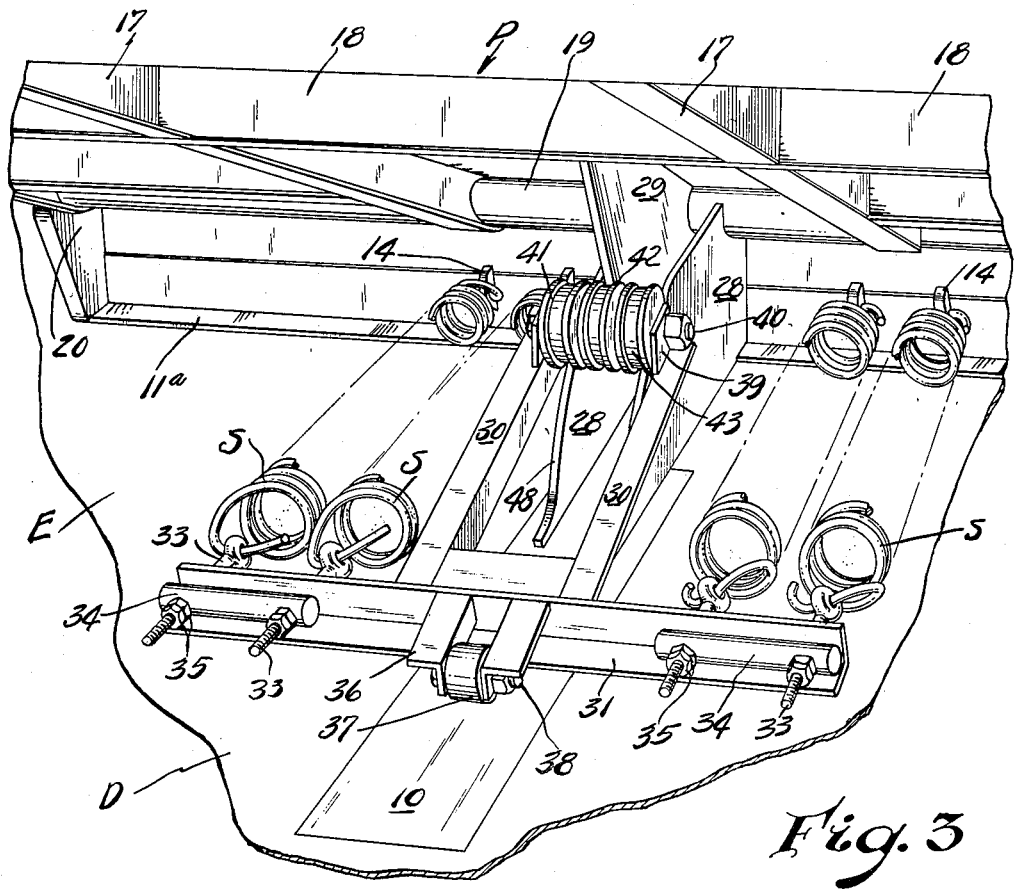
Fig. 3
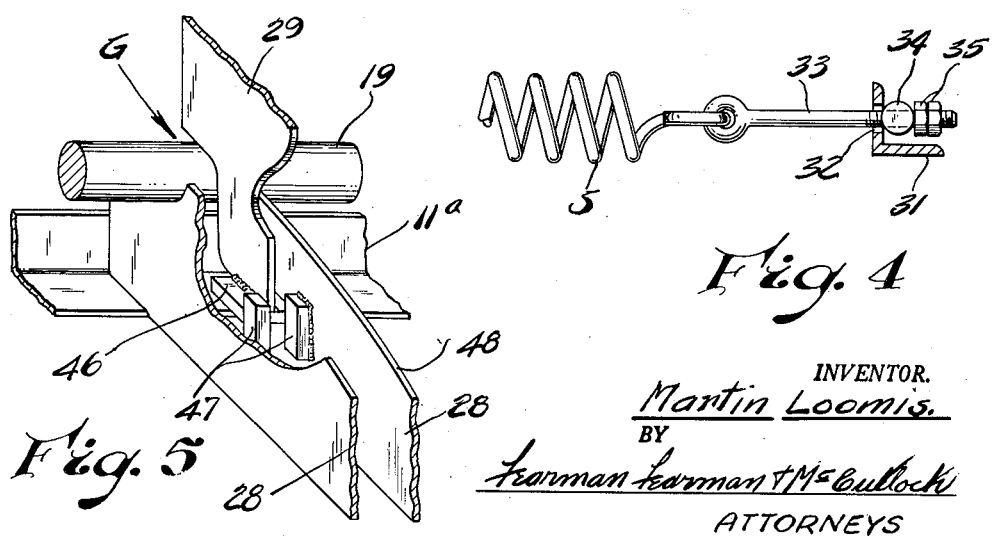
Fig. 4
Fig. 5
INVENTOR.
Martin Loomis.
BY
Fearman Fearman & McCulloch
ATTORNEYS

United States Patent Office 3,137,876
Patented June 23, 1964

3,137,876
DOCK LEVELER CONSTRUCTION
Martin Loomis, Clare, Mich., assignor to Loomis Machine Co., Clare, Mich., a corporation of Michigan
Filed Mar. 3, 1961, Ser. No. 93,145
7 Claims. (Cl. 14—71)

This invention relates to dock levelers, and more particularly to a dock leveler adapted to be mounted on a dock or other support with the lip of the leveler, when in lowered position, projecting beyond the front edge of the dock and resting on a truck or carrier to thus form a continuous, smooth, unobstructed passage or runway between the dock and carrier so that articles of freight may be wheeled, trucked or carried from the dock to the carrier, or from the carrier or truck to the dock.

Manually actuated dock levelers to which the instant invention is directed are designed to minimize weight, eliminate automatic working parts, and provide counterbalancing means to enable a workman to readily swing the platform from lowered to raised position and return, and otherwise provide a lightweight dock leveler which can be readily manufactured, assembled and installed with a minimum of cost and labor.

One of the prime objects of the invention is to design a simple, practical, and relatively inexpensive, lightweight, counterbalanced dock leveler, the platform of which can be manually actuated and easily swung from lowered to raised position, and back to lowered position with minimum effort.

Another object of the invention is to provide a manually actuated dock leveler having spring loaded lift means to counterbalance and assist in the swinging movement of the platform, as well as to equalize the force required to raise and lower the platform throughout its entire arc of travel, and to provide adjustable means associated with the springs for regulating tension of the counterbalancing means.

A further object of the invention is to provide opposed cam members mounted on the lower face of the platform and on the dock respectively, and provide a spring tensioned lift assembly, including cam followers engageable with said cams for exerting a raising or lifting force on the platform as it is swung to its various positions of adjustment.

A still further object is to design a dock leveler composed of relatively few parts, all of simple and sturdy construction, which has ample capacity for the work intended, and which is of the packaged type, making it comparatively easy and economical to transport and install.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion and minor details of construction, without departing from the spirit, or sacrificing any of the advantages of the invention.

In the drawings:

FIGURE 3 is an enlarged, fragmentary, isometric view showing the cams and associated mechanism.

FIGURE 4 is an enlarged, part sectional detail showing one of the lift springs and its connection to the cross header.

FIGURE 5 is a detail perspective view showing the stop.

Figure 2:
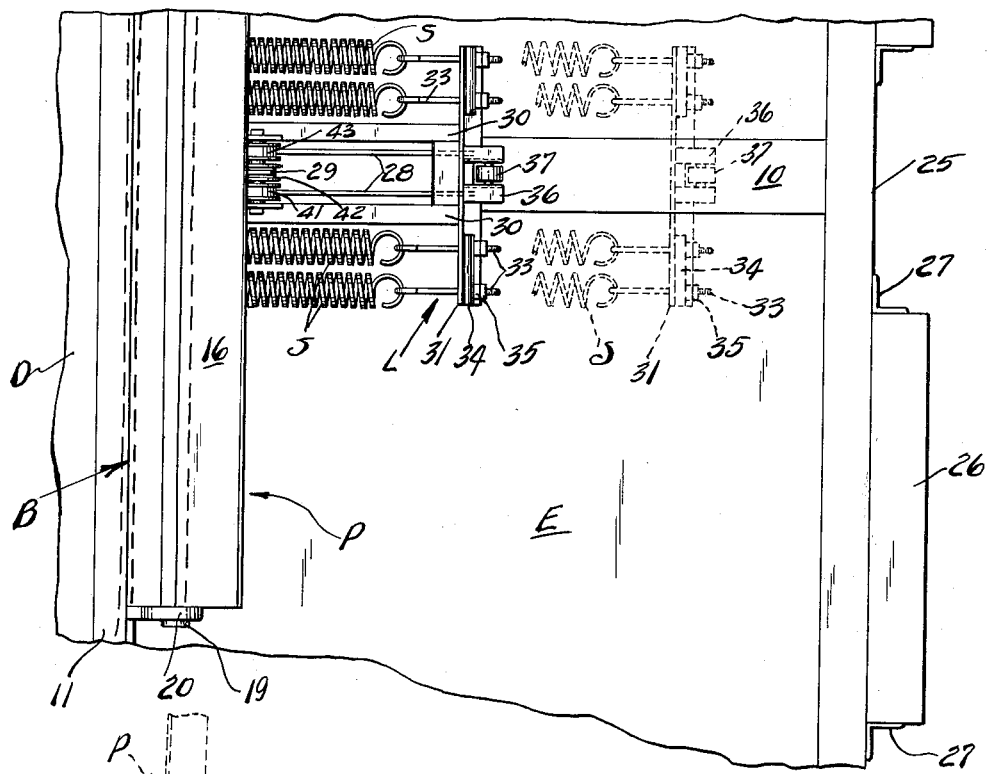
FIGURE 2 is a fragmentary, top plan view of the leveler with the platform in raised position, the broken lines showing the position of the floating mechanism when the platform is in its lowered position.
Figure 6:
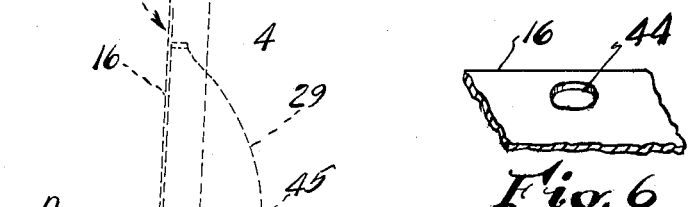
FIGURE 6 is a fragmentary perspective view showing one of the hand holds in the floor plate.

Referring now to the drawings, my new dock leveler is designated generally by the reference character B and preferably it is of the packaged type to facilitate delivery and easy installation. In the disclosed embodiment the leveler is shown mounted on a support or dock D, the upper face of which is recessed as at E to accommodate the leveler, and the upper face of the recessed dock area is provided with a sheet metal plate 10 which serves as a smooth trackway and for a purpose to be hereinafter described.

Transversely disposed angles 11—11a form the rear or curb face of the one end 12 of the recessed dock area and are anchored in the dock in any desired manner. Clips 14 are welded to the exposed face of the angle 11a and are provided with transversely spaced openings 15 therein in which the ends of a plurality of springs S are detachably anchored.

The leveler includes a platform P that comprises a preferably steel plate floor 16, the lower face of which is provided with longitudinally and transversely disposed reinforcing members 17 and 18, respectively, welded to the plate and to each other, and a transversely disposed shaft 19 spans the upper end of the leveler at the rearward end of the platform section. The plate 16 is welded to the shaft in such manner that the opposite ends of the shaft project beyond the side edges of the platform and are journaled in bearings 20 which are secured to the member 11a as usual. The platform is thus hingedly mounted at its rear end for swinging movements between raised and lowered positions.

The platform P, when in its lowered position, is normally disposed at a slight downward angle from the horizontal. The outer free end of the platform terminates in a projecting lip section 21, the outer end of which is beveled as at 22 to eliminate bumps when wheeled hand trucks, etc. (not shown) travel thereover. Preferably the lip 21 is formed of somewhat heavier stock than the platform P, and an inclined brace 23 may be welded to a reinforcing member 24 and to the lip as shown.

An angle 25 forms the upper outer corner of the dock, and resilient bumper members 26 are secured to the vertical face thereof in any approved manner. It will, of course, be understood that these bumpers can extend entirely across the width of the leveler or can be in one or more sections properly located, and can be held in position by angles 27 or the like, so that the carrier (not shown) backs thereagainst.

A pair of spaced apart linear track or cam members 28—28 are supported on the face of the recessed section of the dock in the position shown, and another track or cam 29 is supported on and projects from the lower face of the platform between the cams 28—28 as shown. Each of the members 28 has a cam surface 48 which rises from the dock surface in a rearward direction, and the member 29 has a similar rise surface 49.

A floating lift assembly L is mounted on the recessed face of the dock and includes spaced apart, longitudinally extending bar members 30—30, the outer end sections of which are welded or otherwise secured to a transversely disposed header bar 31. The ends of the bar project beyond the members 30—30 and are formed with enlarged openings 32 to accommodate the threaded ends of eyebolts 33 which project therethrough, and to which the ends of the springs S are connected. A preferably cylindrical bar 34 is mounted on the eye bolts 33 to permit angular movement of the latter, and nuts 35 are threaded on the ends of the bolts to permit adjustment and tensioning of the springs S when required.

Angles 36—36 are welded to the bar 31 and form an extension of the lifter members 30—30, and a roller 37 is journaled on a pin 38 carried by the angles, the roller riding on the plate 10 when the platform is operated. Cheek plates 39 are welded to the members 30—30 and project thereabove, and a transversely disposed shaft 40 spans the plates and has a plurality of cam followers 41, 42 and 43 respectively journaled thereon. The followers 41 and 43 register with and ride on the cams 28—28, and the follower 42 registers with and rides on the face of the cam 29.

Figure 1:
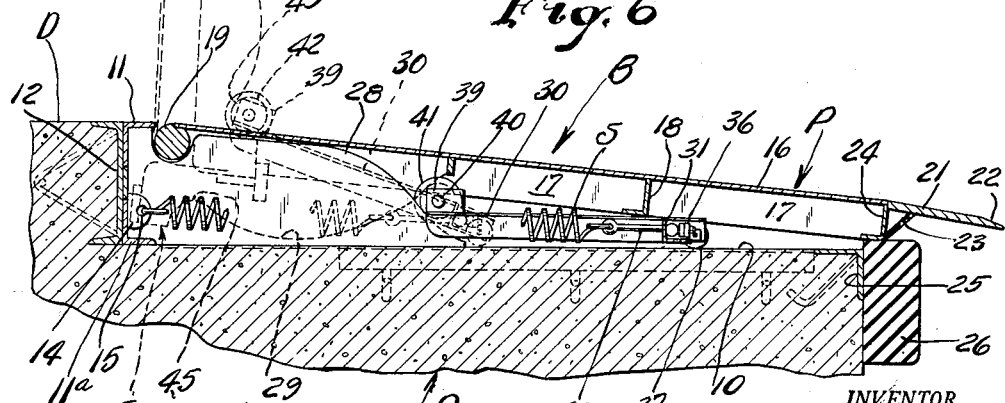
FIGURE 1 is a sectional, side elevational view of a dock showing my dock leveler mounted in position thereon, the broken lines showing the platform in raised position.

Hand holds 44 are provided on the opposite sides of the platform to facilitate the lifting and lowering thereof, and a dwell area 45 is provided in the face of the cam 29. The cam roller 42 is adapted to be received in the dwell area 45 to hold the platform in its raised position as shown in broken lines in FIGURE 1 of the drawings.

A stop G is provided on the platform cam for positively limiting the rearward swing of the platform. The stop means preferably comprises a plate 46 welded to the end of the cam 29 and bars 47 welded to the inner faces of the cams 28—28, the parts 46 and 47 engaging one another when the platform has been raised fully to limit further upward and rearward swing of the platform.

The cam surfaces of the cams 28—28 are so generated that they rise in a direction rearwardly of the platform and, when the platform is in lowered position, the cam followers 41, 43 of the lifter arm assembly L, engage the rising face 48 of each of the cams 28. The forward surface of the platform cam 29 is similarly generated, to provide a rise section 49 which merges or falls to form the dwell area 45.

When the platform is in its lowered position, the lift means L is urged rearwardly by the tension of the springs S. When the dock attendant grasps the hand holds 44 on the edge of the platform and exerts a lifting force, which is within the range of easy operation, the platform swings upwardly, assisted by the force of the springs which act on the rollers 41–43 urging them between the cams 28 and 29, thereby exerting a lifting force on the platform. When the platform reaches the raised position, shown in broken lines in FIGURE 1 of the drawings, the roller 42 will have reached the dwell section 45 on the platform cam 29 which serves to maintain the platform in raised position until such time as it is desired to swing it to its position.

When the attendant exerts a downward force on the platform to swing it to its lowered position, the lifter and roller assembly rides on the cams 28 and 29, the fall portion of the cam 29 forcing the cam rollers outwardly and tensioning the springs so that the downward swing will be smooth and even, eliminating sudden, sharp shocks or rebounds when the free end of the platform contacts and comes to rest on the bed of the truck or carrier (not shown), the action being in the nature of a scissors movement with the cam rollers interposed between the cams.

From the foregoing description, it will be understood that I have perfected a very simple, practical and comparatively inexpensive dock leveler which is easy to install and operate, and which can be manually operated by one person and swung from lowered to raised position with a minimum of effort and without sharp drops or jars at either end of the swing.

What I claim is:

1. A dock leveler construction adapted to bridge a space between a dock and a carrier to be loaded or unloaded at said dock, said construction comprising a support member; a platform member hingedly mounted at its rearward end for swinging movements between raised and lowered positions; first track means supported on said platform member between the latter and said support member; second track means supported on said support member between the latter and said platform member, at least one of said track means having a cam surface thereon formed on a rise from its support in a direction toward the rearward end of said platform member; follower means interposed between said members in engagement with said cam surface and with the other of said track means; means mounting said follower means for movement toward and away from the rearward end of said platform member; and yieldable means acting on said follower means and urging the latter in a direction toward the rearward end of said platform member when the latter is in its lowered position.

2. The construction set forth in claim 1 wherein said cam surface is on said first track means.

3. The construction set forth in claim 1 wherein said cam surface is on said second track means.

4. The construction set forth in claim 1 wherein the rise of said cam surface terminates at its rearward end in a fall portion to provide a dwell to receive said follower means when said platform member is in its raised position.

5. The construction set forth in claim 1 including a second cam surface on the other of said track means and having a rising cam surface located in the path of rearward movement of said follower means when said platform member is in its lowered position.

6. A dock leveler construction adapted to bridge a space between a dock and a carrier to be loaded or unloaded at said dock, said construction comprising a support member; a platform member hingedly mounted at its rearward end for swinging movements between raised and lowered positions; first cam means supported on one of said members; second cam means supported on the other of said members, each of said cam means having at least a portion of its cam surface formed on a rise from its supporting member in a direction toward the rearward end of said platform; follower means interposed between said first and second cam means in engagement with the cam surfaces of both of said cam means and movable toward and away from the rearward end of said platform member; and yieldable means acting on said follower means and urging the latter in a direction toward the rearward end of said platform member when the latter is in its lowered position.

7. The construction set forth in claim 6 including adjustable means acting on said yieldable means for adjusting the force by which the follower means is urged rearwardly.

References Cited in the file of this patent

UNITED STATES PATENTS

| 32,846 | Virdin | July 16, 1861 |
| 204,407 | Williams | May 28, 1878 |
| 2,994,894 | Loomis | Aug. 8, 1961 |